United States Patent [19]
Campanella

[11] Patent Number: 5,835,487
[45] Date of Patent: Nov. 10, 1998

[54] SATELLITE DIRECT RADIO BROADCAST SYSTEM

[75] Inventor: S. Joseph Campanella, Gaithersburg, Md.

[73] Assignee: WorldSpace International Network, Inc., Virgin Islands (Br.)

[21] Appl. No.: 569,346

[22] Filed: Dec. 8, 1995

[51] Int. Cl.$^6$ ........................................................ H04J 4/00
[52] U.S. Cl. .......................... 370/316; 370/319; 370/320; 370/330; 455/12.1; 455/13.1; 455/3.2
[58] Field of Search ................................ 370/49.5, 97, 50, 370/104.1, 307, 316, 319, 320, 330; 455/4.1, 4.2, 5.1, 6.1, 6.2, 6.3, 13.3, 3.2, 12.1; 348/10, 11, 12, 13, 7, 6

[56] References Cited

U.S. PATENT DOCUMENTS

| | | | |
|---|---|---|---|
| 3,789,142 | 1/1974 | Shimaski et al. ........................ | 179/15 |
| 4,425,639 | 1/1984 | Acampora et al. ...................... | 370/97 |
| 4,480,328 | 10/1984 | Alaria et al. . | |
| 4,931,802 | 6/1990 | Assal et al. ............................. | 370/97 |
| 5,473,601 | 12/1995 | Rosen et al. ............................ | 370/319 |
| 5,485,464 | 1/1996 | Strodtbeck et al. .................... | 370/319 |
| 5,625,624 | 4/1997 | Rosen et al. ............................ | 370/319 |

OTHER PUBLICATIONS

S. Joseph Campanella, *Communications Satellites: Oribiting Into The 90's*, IEEE Spectrum, pp. 49–52, Aug. 1990.

G. Losquadro, *Digital Audio Broadcasting: High–Grade Service Quality Through On–Board Processing Techniques*, Centre for Satellite Engineering Research, Jul. 31, 1995.

Maral, Gerard, *VSAT Networks*, pp. 52–53 (John Wiley & Sons, Ltd., 1995).

Chitre, D.M., "The Role of Satellite Communications in the ISDN Era", International Journal of Satellite Communications, vol. 10, No. 5, Sep.–Oct. 1992, pp. 210–215.

Chitre, D.M. et al, "Architectures for the Intelsat NISDN–Compatible Satellite Communications Network", International Journal of Satellite Communications, vol. 10, pp. 217–225 (1992).

*Primary Examiner*—Ajit Patel
*Attorney, Agent, or Firm*—Roylance, Abrams, Berdo & Goodman, L.L.P.

[57] ABSTRACT

A satellite direct audio broadcast system includes a plurality of fixed-rate, uniform, frequency division multiple access ("FDMA") uplinks and a time division multiplexed ("TDM") downlink. Source audio channels may be divided among and transmitted through a selectable number of fixed-rate uplinks so as to have selectable audio quality at the receiver. Fixed-rate FDMA uplinks include information designating related channels as containing related source information. On-board the satellite baseband processing selects uplink information channels for inclusion into none, one or multiple TDM downlinks. Transmitted audio information may be scrambled, and authorization downloaded to receivers to permit descrambling for paid subscription service.

16 Claims, 7 Drawing Sheets

SATELLITE DIRECT RADIO BROADCAST SYSTEM

BACKGROUND

The invention relates to the field of satellite direct radio broadcast, and in particular to a satellite-based broadcast communication system employing frequency division multiplex uplinks and time division multiplex downlinks and for broadcasting and audio (voice and music) programming.

Early satellite communication systems used space-based radio frequency transponders which acted as simple repeaters. In one typical scheme, multiple sources each transmit at a separate uplink carrier center frequency (uplink FDMA), and the satellite transponder repeated each signal at a separate downlink carrier frequency (downlink FDMA). In another typical scheme, multiple sources each transmit bursts at the same carrier frequency in a coordinated fashion so that bursts from different transmitters do not collide (TDMA), and the transponder repeated all signals in a single downlink carrier. Still other schemes utilize multiple antenna beams and on-board-the-satellite switching so that signals in one uplink beam could be controllably switched to a selected downlink beam.

Many prior systems require substantial transmit and/or receive equipment. Furthermore, despite the various types of system architectures, there has not been implemented a system suitable for direct broadcast of audio radio programming to low-cost consumer radio receivers.

SUMMARY

There presently exists a population of over 4 billion people that are generally dissatisfied and underserved by the poor sound quality of short-wave radio or the coverage limitations of amplitude modulation ("AM") band and frequency modulation ("FM") band terrestrial radio broadcast system. This population is primarily located in Africa, Central and South America, and Asia. The satellite Direct Audio Broadcast ("DAB") system of the present invention is intended to provide high quality radio channels accessible to people worldwide who currently receive, with various kinds of limitations, terrestrial radio programming.

An object of the present invention is to provide a satellite direct radio audio broadcast system suitable for transmitting audio signals, such as voice and music programming, to low-cost consumer radio receivers.

A further object of the present invention is to provide a satellite direct audio broadcast system suitable for transmitting multiple audio signals from a variety of sources and signal qualities, such as "AM" band quality monaural, "FM" band quality stereo, and "CD" quality stereo to low-cost consumer radio receivers.

A further object of the present invention is to provide a satellite direct audio broadcast system capable of providing individual uplink broadcasters with direct access to the satellite, yet also capable of preventing unauthorized broadcasts from being received by consumer radios.

A further object of the invention is to provide a satellite direct audio broadcast system capable of providing subscription (paid reception) service by low-cost consumer radio receivers yet also capable of limiting service to non-subscription receivers in the same service area.

These and other objects of the invention are achieved by providing a satellite direct audio broadcasting system having frequency division multiple access uplinks (FDMA) and time division multiplexed (TDM) downlinks. Broadcast stations transmit one or more "prime rate" channels, each having a source signal data rate of sixteen (16) kilobit-per-second (KBPS) data rates. Each prime rate channel is transmitted on a separate carrier. At the satellite, prime rate uplink channels are multiplexed into a single TDM channel. Radio receivers demultiplex the TDM downlink and recombine one or more prime rate channels to provide the selected quality of service. A system control center provides centralized command over the satellite.

BRIEF DESCRIPTION OF THE DRAWINGS

The invention will be described with reference to attached drawings in which.

DETAILED DESCRIPTION OF THE PREFERRED EMBODIMENTS

System Overview

The system preferably will consist of three geostationary satellites, low cost radio receivers, and associated ground control networks. The preferred satellites cover the African-Arabian region, Asian region and the Caribbean and Latin American regions from the following geostationary orbits:

21° E orbital location, providing DAB to Africa and Middle East

95° W orbital location, providing DAB to Central and South America

105° W orbital location, providing DAB to South-East Asia, and Pacific rim

The preferred system uses the frequency band of 1467 to 1492 MHz, which has been allocated for Broadcasting Satellite Service (BSS) DAB at WARC 92, that is, in accordance with resolutions 33 and 528 of the ITU. The broadcasters use feeder uplinks in X band, from 7050 to 7075 MHz.

The system will use digital audio coding techniques. Each satellite will deliver digital radio audio signals having qualities equivalent to AM monaural, FM monaural, FM stereo and CD stereo throughout its respective coverage area, together with ancillary data such as paging, video images and text transmissions directly to the radios. The system may also deliver multimedia services such as large database downloads to PCs for business applications, map and printed text information for travelers, and even color images to augment audio programs for advertising and entertainment.

Each satellite preferably will be equipped with three downlink spot beams, having beamwidths of about 6°. Each beam covers approximately 14 million square kilometers within power distribution contours that are 4 dB down from beam center and 28 million square kilometers within contours that are 8 dB down. The beam center margin may be 14 dB based on a receiver gain-to-temperature ratio of −13 dB/K.

Figure 1:
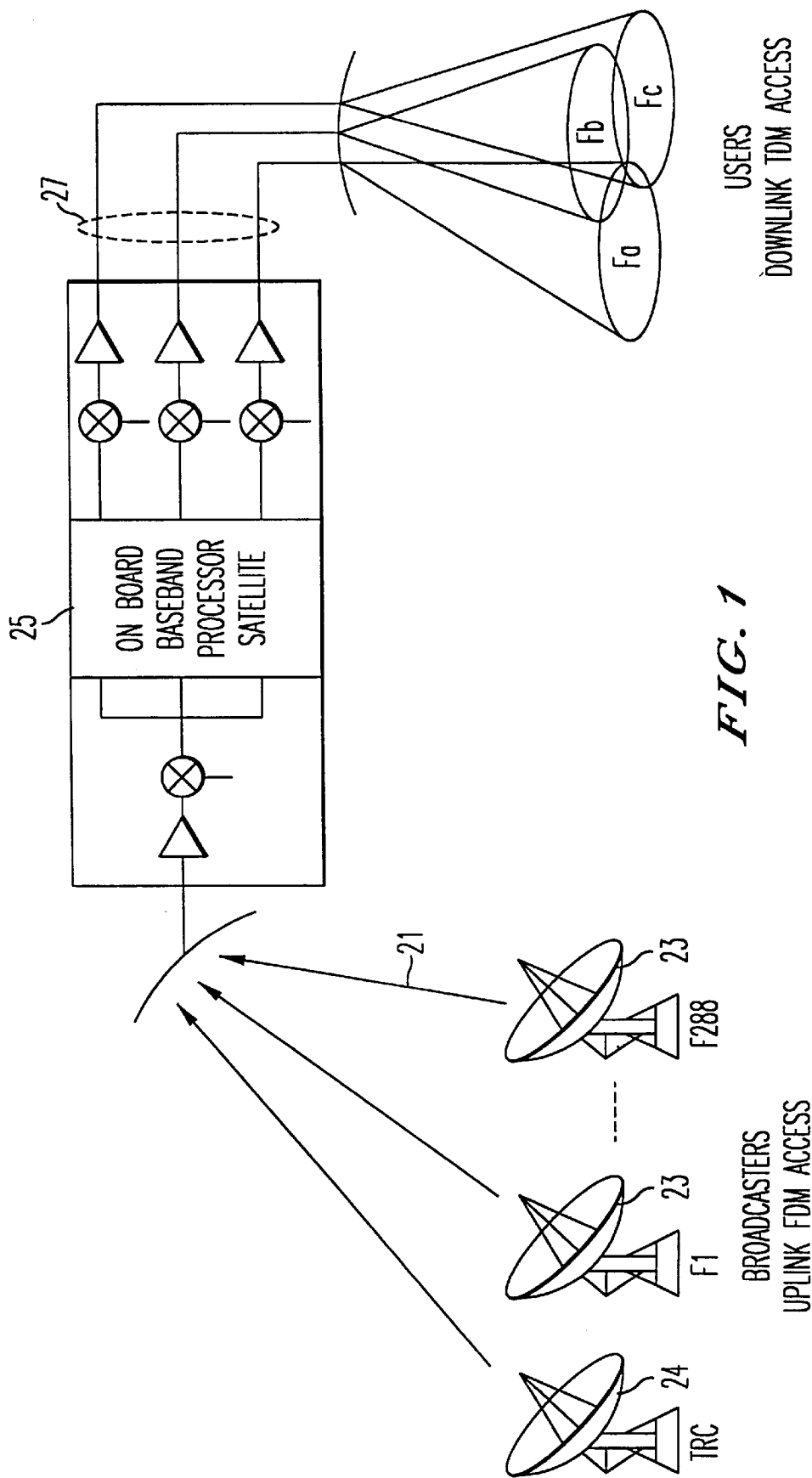
FIG. 1 illustrates the principle of operation of the processed communication mission in a satellite system of the present invention.

FIG. 1 illustrates the principle of operation of a satellite system of the present invention. The uplink signals 21 issue from broadcasters via individual frequency division multiple access ("DM") channels from earth stations 23 located anywhere within the terrestrial visibility of the satellite with elevation angles higher than 10°. Each broadcaster has the ability to uplink directly from its own facilities to one of the satellites placing one or more 16 KBPS prime rate channels on a single carrier. Alternately, broadcasters which have no capacity for direct access to the satellite may have access through a hub station. Use of FDMA for uplink offers the highest possible flexibility between multiple independent broadcast stations.

Conversion between uplink FDMA and downlink MCPC/TDM is achieved on board the satellite at the baseband level. At the satellite 25, each prime rate channel transmitted by a broadcast station is demultiplexed into individual 16 kbps baseband signals. Individual channels are routed to one or more of the downlink beams 27, each of which is a single TDM signal. This baseband processing provides a high level of channel control in terms of uplink frequency allocation and channel routing between uplink and downlink. Uplink signals are received in the satellite in X band and down converted to L band.

Downlinks use multiple channel per carrier time division multiplexing. One of these carriers is used in each of the three beams on each satellite. TDM quadature phase shift key ("QPSK") transmission is performed using concatenated Forward Error Correction (FEC) coding, and System A (COFDM) using a Viterbi FEC coding.

Figure 2:
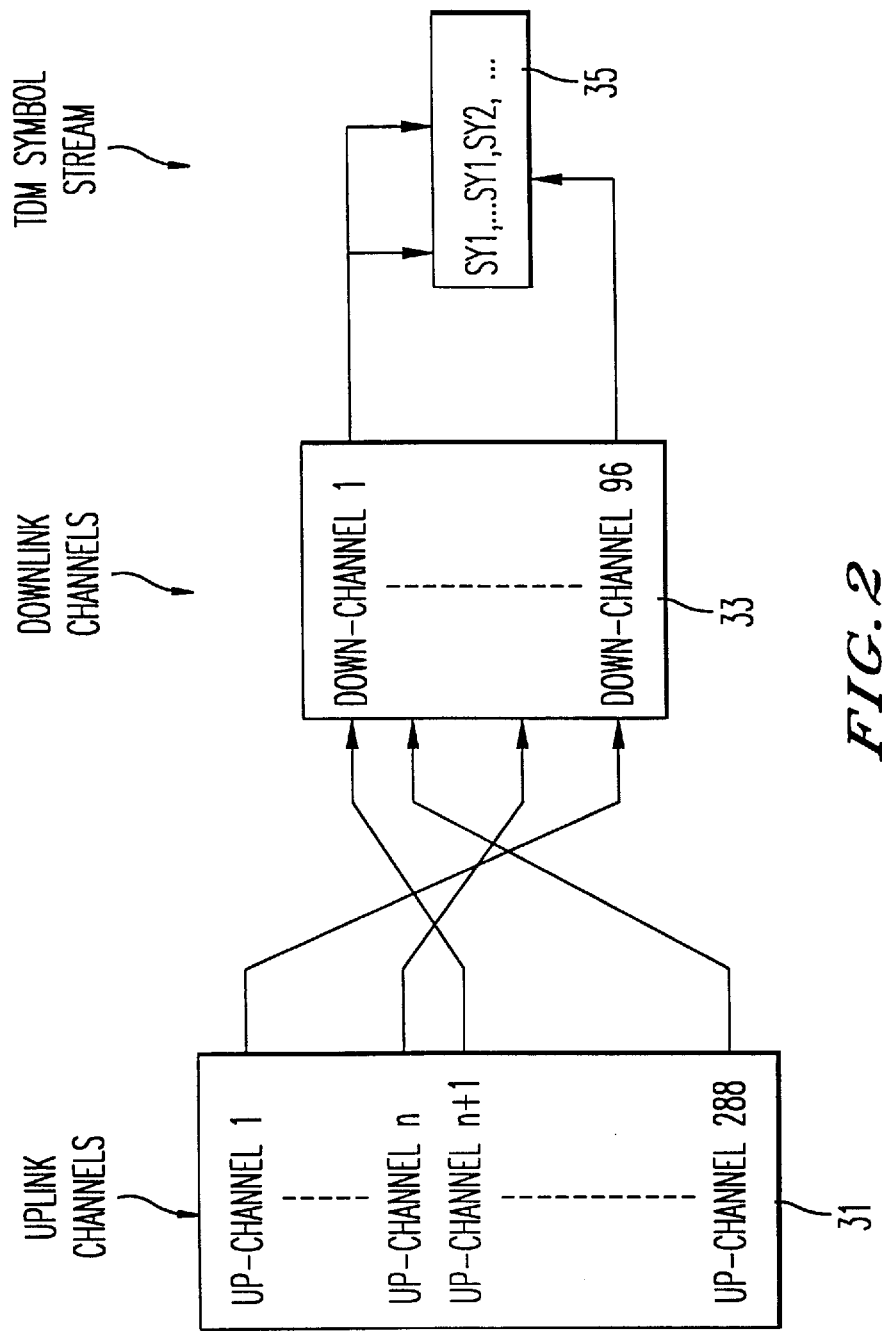
FIG. 2 illustrates a re-allocation of information from uplink frequency division multiple access channels into a downlink time division multiplexed channel in a satellite communication system of the present invention.

FIG. 2 illustrates the re-allocation of prime rate channels from uplink frequency division multiple access channels into a downlink time division multiplexed channel in a satellite communication system of the present invention. The overall uplink capacity is preferably between two-hundred-eighty-eight (288) and three hundred eighty four (384) prime rate uplink channels 31 of sixteen (16) kbps each. Ninety six (96) prime rate channels 33 are selected and multiplexed for transmission in each downlink beam 35 time division multiplexed onto a carrier of approximately 2.5 MHz bandwidth. Each uplink channel may be routed to all, some or none of the downlink beams. The order and placement of prime rate channels in a downlink beam is fully selectable from a telemetry, range and control ("TRC") facility 24.

The carrier frequencies in each downlink beam are different to enhance beam-to-beam isolation. Each TDM downlink channel is operated in the satellite payload at saturation, giving the highest possible power efficiency in terms of link performance. Use of single carrier per transponder operation achieves the most efficient operation of the satellite communication payload in terms of conversion of solar power into radio frequency power. This is far more efficient than techniques requiring simultaneous amplification of a multiplicity of FDM carriers. The system produces high receive margins suitable for stationary and mobile reception indoors and outdoors.

Radio Channel Capacity

The system incorporates source coding using MPEG 2, Layer 3 which achieves the cited qualities at bit rates of 16, 32, 64 and 128 kbps respectively. Error rates over the system will be less than $10^{-10}$ and thus are also suitable for high quality digital image and data transmission for multimedia services. The MPEG 2 layer III coding offers a better bit rate efficiency than the previous MPEG 1 layer II (Musicam) standard for the same audio quality. The digitally coded source bit rates are:

16 kbps for monophonic voice, 32 kbps for monophonic music, with near FM quality, 64 kbps for stereophonic music, with near FM quality, 128 kbps for stereophonic music, with near CD quality.

Gain on bit rates are about 50%, depending on the quality, with respect to layer II. The MPEG 2 layer III coding is downward compatible and allows, for example, the use of MPEG 1 layer II if needed.

In the preferred implementation, each satellite has the capacity to transmit a total capacity of 3072 kbps per beam which may be any combination of the above audio services. This corresponds to a capacity per beam of:

192 monophonic voice channels, or 96 monophonic music channels, or 48 stereophonic music channels, or 24 CD stereophonic music channels, or any combination of the above signal quality.

The overall system will deliver the digital signals with a bit error rate (BER) of $10^{-4}$ or better, providing the various service qualities previously defined. For each downlink TDM in L band issued from the satellites, the Edge Of Coverage EIRP of the TDM carrier will be 49.5 dBW. This EIRP, together with specific Forward Error Correction, insures a minimum 9 dB margin for a $10^{-4}$ BER, using the baseline radio receiver antenna. This margin will help combat signal loss due to obstacles in the path between the satellite and the receiver, providing full quality reception in the intended coverage area.

Radio receivers in disadvantaged locations can be connected to a large gain antenna, or to an antenna located in an unobstructed position. For example, reception in large buildings may need a common roof antenna for the entire building or individual reception antennas near a window. At the 4 dB down contour of the earth coverages, the channels have an estimated margin of 10 dB relative to the power density needed to deliver a bit error rate of $10^{-4}$. At beam center this margin estimate is 14 dB.

Prime rate channels are the building blocks of the system and can be combined to achieve higher bit rates. Prime rate channels can be combined to create program channels at bit rates up to 128 kilobits per second. The operating margin does not change for the higher bit rates. Within the 4 dB contour, most radios will view the satellite at elevation angles of greater than 60° making interference from structures virtually nil. Within the 8 dB contour the elevation angle to the satellite will be greater than 50° which may experience occasional interference due to reflections or blockage from structures.

The Satellite

The system includes a baseband processing satellite payload. Baseband processing allows improved system performance, at least for uplink and downlink link budgets, management of broadcast stations, and control of the downlink signals.

Figure 3:
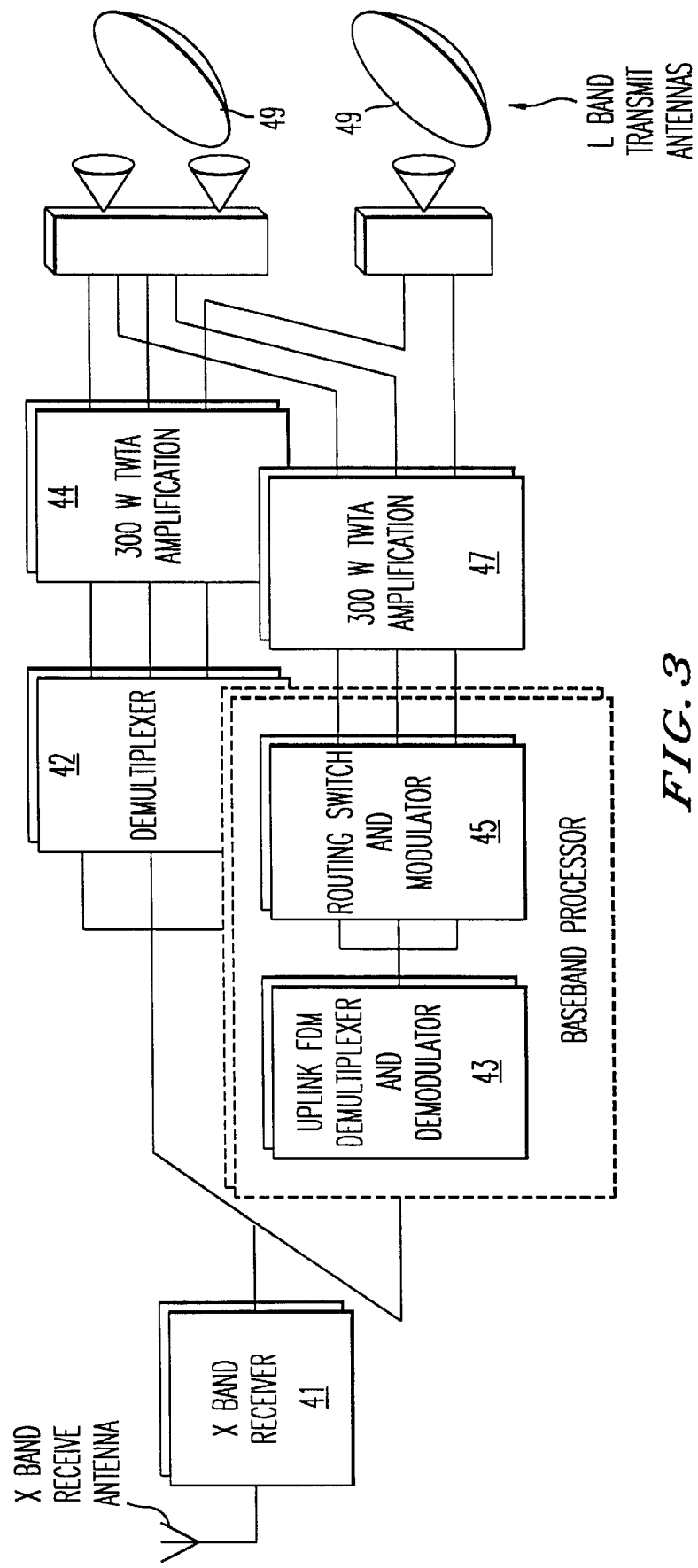
FIG. 3 illustrates satellite signal processing in a satellite communication system of the present invention.

FIG. 3 illustrates satellite signal processing in a satellite communication system of the present invention. The coded prime rate uplink carriers are received at an X-band receiver 41. A polyphase demultiplexer and demodulator 43 receives the 288 individual FDMA signals, generates a single analog signal on which the data of the 288 signals is time multiplexed, and performs a high-speed demodulation of the serial data. A routing switch and modulator 45 selectively directs individual channels of the serial data into all, some or none of three downlink signals, and further modulates and upconverts the three downlink signals. Traveling wave tube amplifiers 47 boost the three downlink signals, which are radiated to earth by L-band transmit antennas 49. The satellite also includes a demultiplexer 42 and amplifier group 44, which is configured in a conventional "bent pipe" signal path which frequency converts input signals for retransmission.

Figure 4:
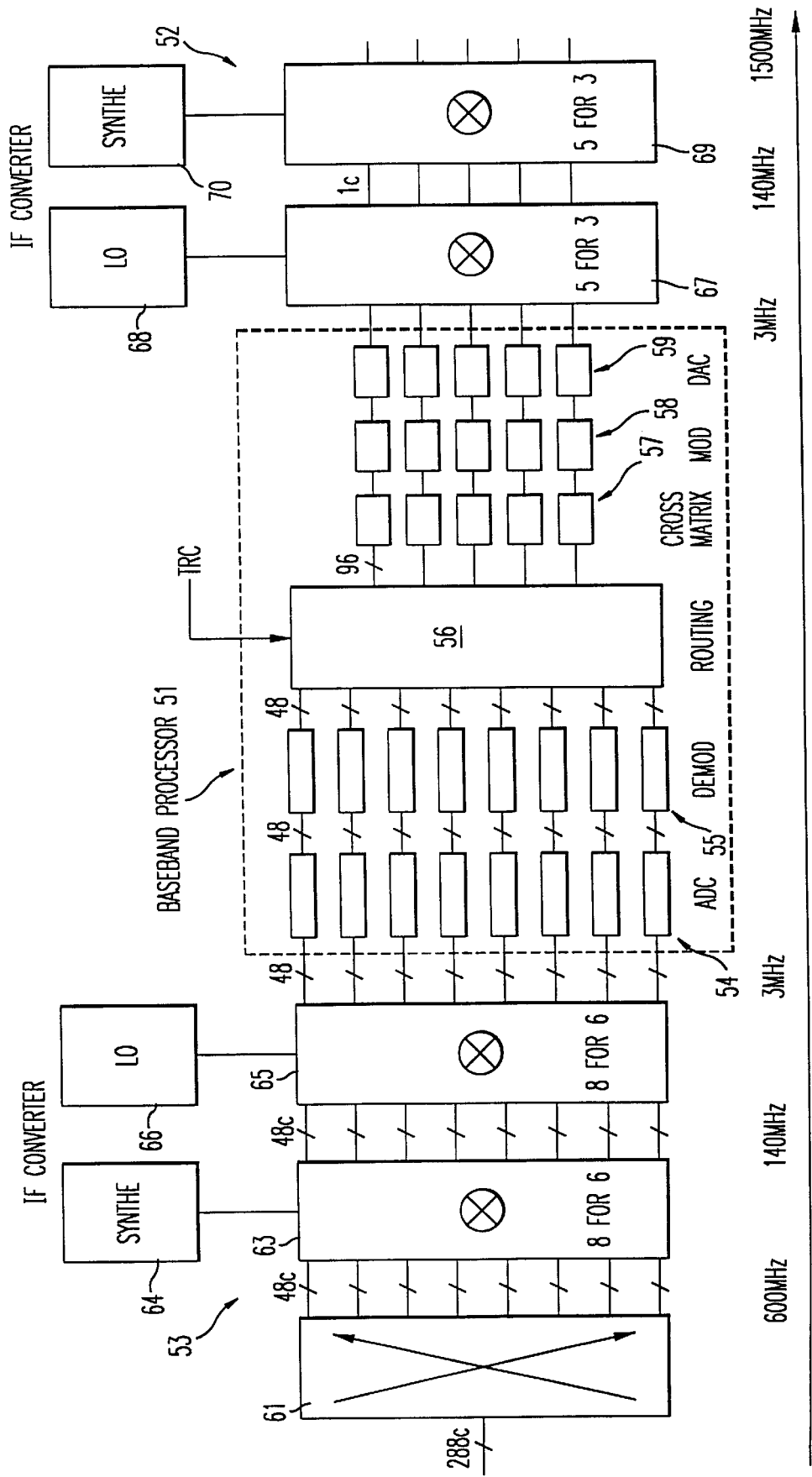
FIG. 4 illustrates a satellite processor in a satellite communication system of the present invention.

FIG. 4 illustrates a satellite baseband processor 51 and associated downconverter 53 and upconverter 52 elements in a satellite communication system of the present invention. The downconverter receives 288 carriers in a wideband input to a divider 61. The divider provides eight, six-hundred megahertz output ports each capable of carrying forty eight (48) of the uplink prime rate channels (still modulated on separate carriers). A first, eight-for-six redundant downconverter 63 (operating in conjunction with synthesizer 64) selectively drops any selected input to an intermediate frequency of about one hundred and forty megahertz. Although eight redundant downconvert paths are provided, only six are required for the two-hundred and eighty-eight prime rate channels.

A second, eight-for-six redundant downconverter 65 (operating in conjunction with local oscillator 66) drops selected intermediate frequency inputs to a baseband signal of about three megahertz. As with the first downconverter, eight paths are provided while only six are required.

The baseband processor 51 includes eight redundant chains of analog to digital converters 54 and demodulators 55. Each A/D converter receives a single signal having forty-eight prime rate channels still on separate carriers. The demodulator includes a polyphase demultiplexer/demodulator that produces a single output with information from the prime rate channels time multiplexed. Router 56 includes digital memory storage such that the serial data streams from all selected demodulator chains are stored as received, and which allows data for each of the two-hundred eighty eight channels to be read out to any of five redundant output paths. Three paths are active at a time (one for each downlink beam), and the additional paths are provided for redundancy. Each output path will receive data in parallel for ninety six prime rate channels. Any prime rate channel may be read out to none, some or all selected output paths. Cross matrix elements 57 serve to time division multiplex data from the ninety-six selected prime rate channels into a single TDM digital signal. Modulators 58 and digital to analog converters 59 generate quadrature-phase-shift-key modulated baseband signals with about a three megahertz bandwidth. A first, five-for-three redundant upconverter 67 (in conjunction with local oscillator 68) modulates selected baseband signals to an intermediate frequency of about one-hundred and forty megahertz. A second, five-for-three redundant upconverter 69 (in conjunction with synthesizer 70) upconvert selected intermediate-frequency signals to L-band (near fifteen hundred megahertz).

Each carrier is amplified to a power of 300 watts by an amplifier consisting of multiple, parallel connected traveling wave tubes. Because only one carrier is amplified by each tube, it is possible to operate the tubes near their maximum saturated power output. Such single-carrier-per-tube operation permits far more efficient use of the onboard spacecraft power resources than can be achieved by more conventional multiple FDMA carrier operation. An advantage of 3 to 4 dB in terms of more power available to the downlink channels results. The bandwidth required to accommodate each carrier is 2.5 MHz. Carriers can be located on frequency centers separated by 500 kHz spacings anywhere in the band. Carrier separations on the same satellite must be at least 2.5 MHz.

Figure 5:
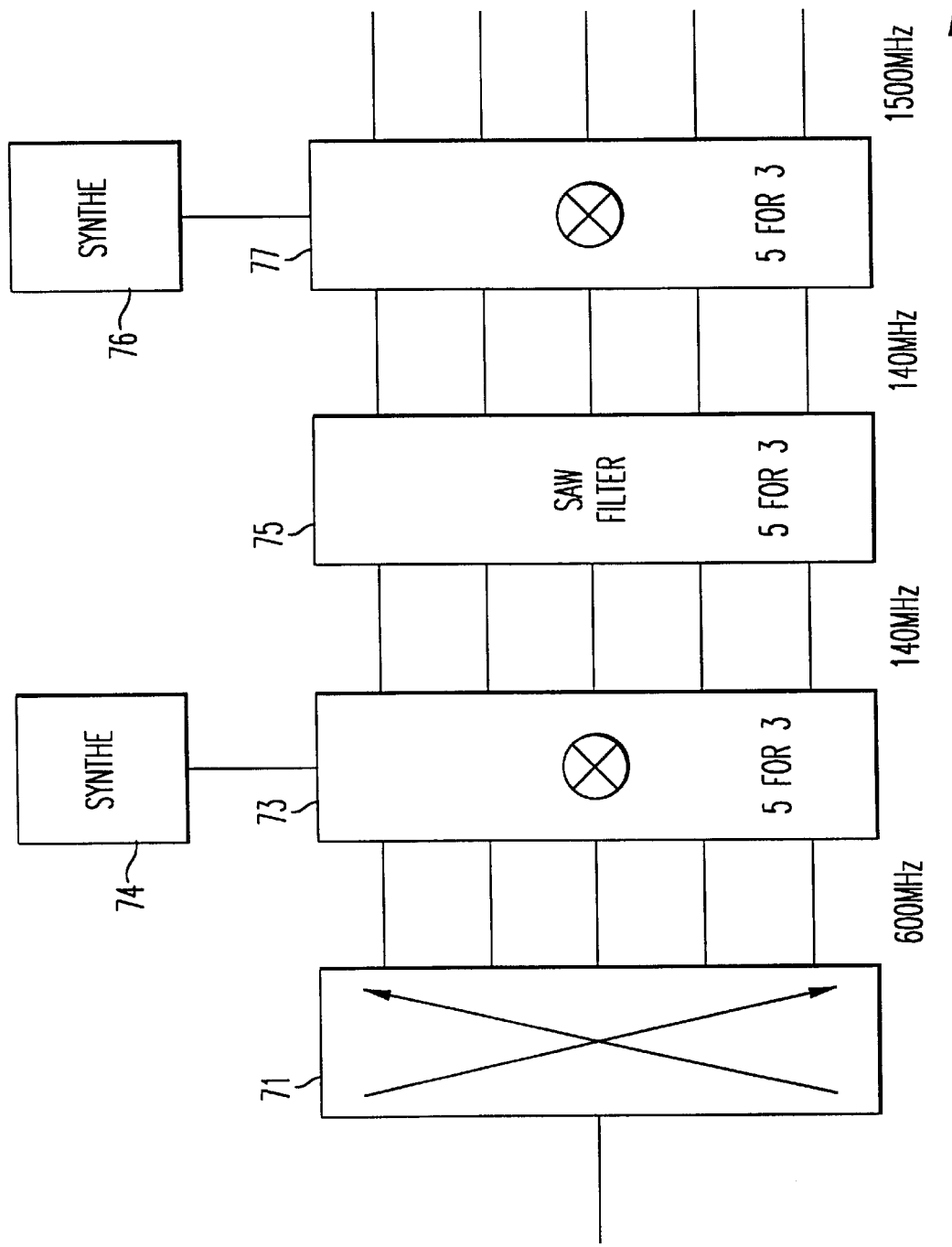
FIG. 5 illustrates a transparent satellite transponder arrangement in a satellite communication system of the present invention.

Each satellite will also be equipped with a transparent transponder arrangement as shown in FIG. 5. A divider 71 separates the wideband uplink into five paths each having a bandwidth of about six-hundred megahertz. A five-for-three redundant downconverter 73 (in conjunction with synthesizer 74) drops the radio frequency signal of the selected path to an intermediate frequency of about one-hundred forty megahertz. Five-for-three redundant surface acoustic wave (SAW) filters 75 remove uplink noise. A five-for-three upconverter 77 (in conjunction with synthesizer 76) translates the filtered intermediate frequency signals to L-band around fifteen hundred megahertz. This arrangement repeats an additional 96 prime rate channels on a downlink MCPC time division multiplexed carrier that is formatted at an uplink hub broadcast station. One such station could serve all three beams or different hubs could be used for each beam. Each repeated MCPC time division multiplexed carrier will have the same downlink waveform, the same power, but the opposite polarization and/or different carrier frequency as the one generated onboard the satellite. Thus, the total capacity per beam will be 192 prime rate channels.

High redundancy in the spacecraft receivers, digital processors and output high power amplifiers guarantees a 12 year life for each satellite. Also there is enough position keeping fuel to maintain each satellite to a location within ±0.1° of its assigned orbit position for 15 years.

The time division multiplex frames have a duration of 1 second, each marked by a 40 symbol synchronization word. The downlink multiple channel per carrier (MCPC) time division multiplexed carrier has a rate of 1.767688 million QPSK symbols per second.

The satellites are operated by a ground control segment and managed according to traffic requirements by a mission control segment during the orbit lifetime. The bit rates and consequently qualities can be mixed in any beam to meet the demand for service. The bit-rate/quality complexion of the service can be easily changed from ground command and can vary at different times of the day. In the preferred embodiment, channel allocation may be changed on an hour-by-hour basis according to a program schedule established twenty-four hours in advance. Radio receivers, relying on ensemble information included in each prime rate channel, will automatically select those prime rate channels necessary to generate the user-selected audio program.

Uplink Broadcast Stations

Figure 6A:
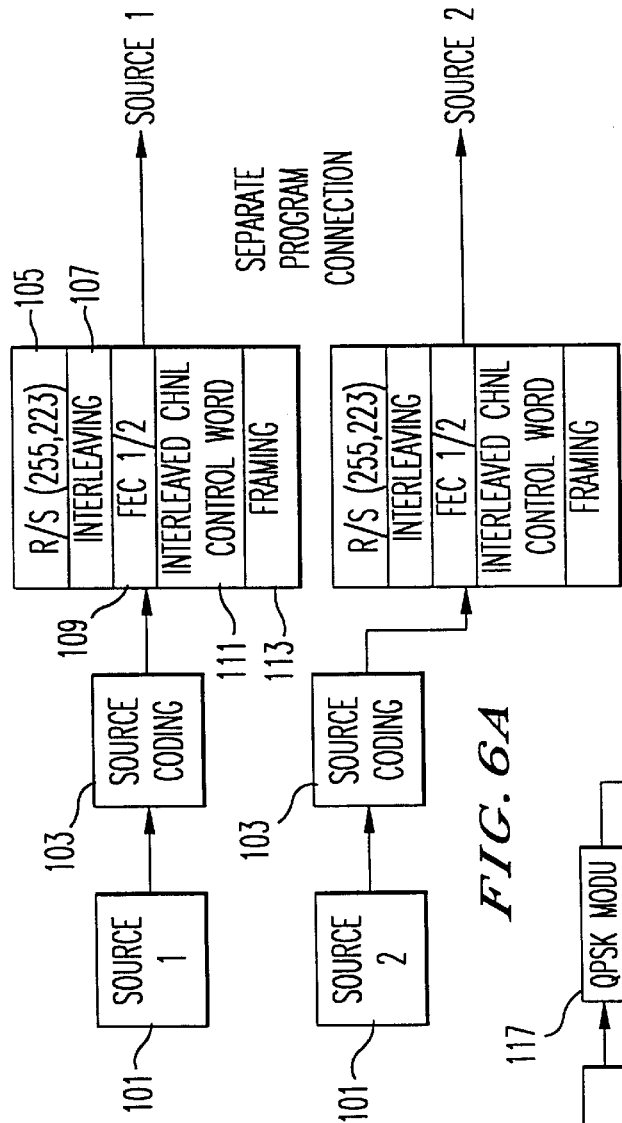
FIG. 6 illustrates program signal processing in a satellite communication system of the present invention.
Figure 6B:
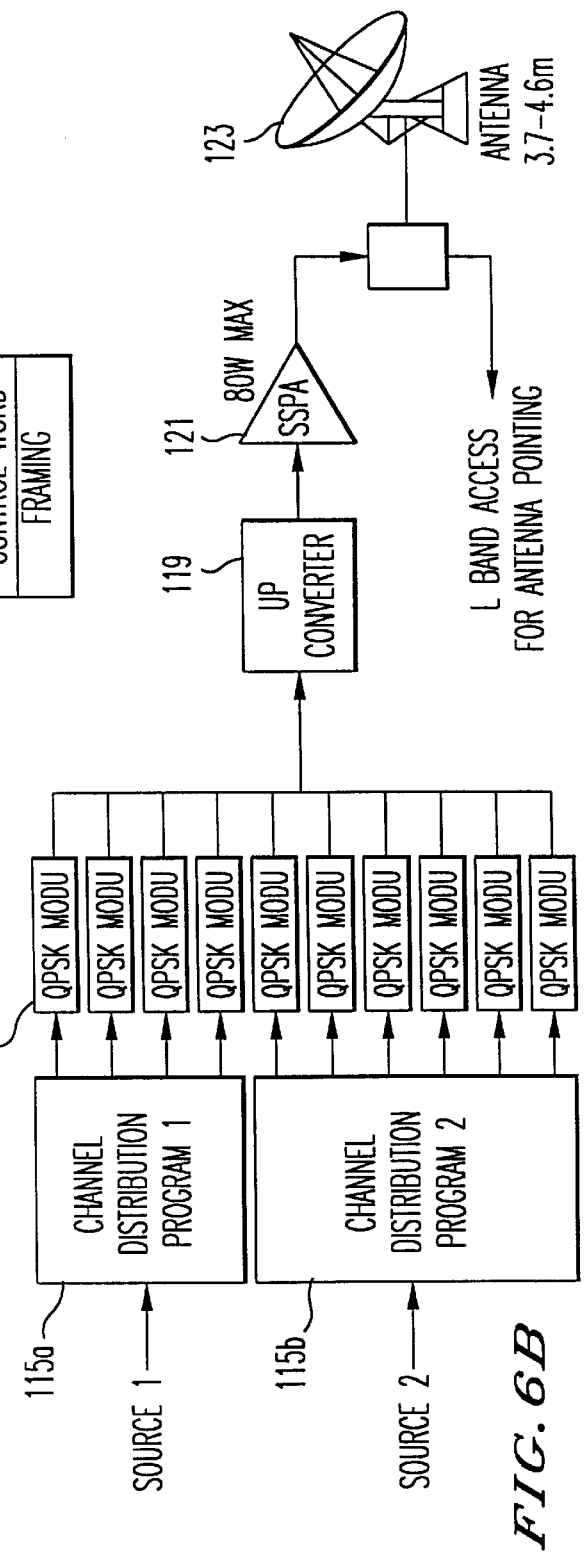

FIG. 6 illustrates program signal processing in a satellite communication system of the present invention. Two sources are shown in FIG. 6, and it should be understood that additional channels may be added with similar signal processing. Signal sources 101 are first subject to MPEG 2 layer III coding 103. The source coded digital signals for the various program channels are forward-error-correction coded using a concatenated channel coding scheme comprising a 255,223 Reed Solomon block coder. The block coder 105 is followed by a block interleaver 107, and then by a rate ½ Viterbi convolution coder 109.

Use of such a concatenated coding scheme contributes to the low bit error rate achieved over the system. Channel coding multiplies the bit rate needed for transmission by a factor of 2×255/223. Thus, the prime rate is increased to 36.72 kilobits per second after coding.

Depending on the program channel rate, the coded program channels are next split among a set of coded prime rate transmit channels. For example, a 128 KBPS channel is split into eight channels as follows:

Symbol 1 into physical channel 1

Symbol 2 into physical channel 2

Symbol 3 into physical channel 3

Symbol 4 into physical channel 4

Symbol 5 into physical channel 5

Symbol 6 into physical channel 6

Symbol 7 into physical channel 7

Symbol 8 into physical channel 8

Symbol 9 into physical channel 1 etc.

A control word 111 in each coded prime rate channel identifies the digital signal group to which it belongs and carries instructions that allow the receiver to recombine the coded prime rate channels to reconstruct the coded program channels. An exemplary eighty (80) bit control word is:

| # Bits | Indication |
| --- | --- |
| 2 | Quantity Of Related Ensembles<br>(00 = no relation, four related ensembles maximum) |
| 2 | Ensemble Identification Number<br>(00=Ensemble #1, 11=Ensemble 4) |
| 4 | Ensemble Type<br>(0000=Audio, 0001=Video, 0010=Data, other types or reserved) |
| 3 | Quantity Of 16 KBPS Prime Rate Channels In Ensemble<br>(000=1 channel, 001=2 channels, ..., 111=8 channels) |
| 3 | Prime Rate Channel Identification Number<br>(000=channel 1, ..., 111=channel 8) |
| 3 | Quantity Of Sub-Ensembles<br>(000=1, ..., 111=8) |
| 3 | Quantity Of 16 KBPS Prime Rate Channels In Sub-Ensemble<br>(000=1, ..., 111=8) |
| 2 | Sub-Ensemble Identification Number<br>(000=Ensemble #1, ..., 111=Ensemble 8) |
| 3 | Ensemble/Sub-Ensemble Blocking<br>(000=no blocking, 001=type 1 blocking, ..., 111=type 7 blocking) |
| 11 | Reserved |
| 40 | CRC. |

The control word entry for the Quantity of Related Ensembles allows a relationship to be created between various groups of ensembles. For example, a broadcaster may wish to provide related audio, video and data services, such as electronic newspaper with audio text, and additional information. The Ensemble Identification Number identifies the ensemble number of which the channel is a part. The Quantity Of 16 KBPS Prime Rate Channels In Ensemble defines the number of prime rate channels in the ensemble. The Quantity Of Sub-Ensembles and Quantity of 16 KBPS Prime Rate Channels In Sub-Ensemble defines a relationship within an ensemble, such as, in a CD quality stereo ensemble, use of four prime rate channels for a "Left Stereo" signal and four different prime rate channels for a "Right Stereo" signal. Alternately, music may be associated with multiple voice signals for announcers, each voice signal in a different language. The Quantity Of 16 KBPS Prime Rate Channels In Sub-Ensemble defines the number of prime rate channels in the sub-ensemble. The Sub-Ensemble Identification Number identifies the sub-ensemble of which the channel is a part.

The Ensemble/Sub-Ensemble Blocking bits allow cooperative blocking of broadcast information. For instance, some countries may prohibit advertising for alcohol. Radios produced for that country can be preset with a code, or a code can otherwise be loaded, so that the radio would respond to the blocking signal and block the specific information.

Each prime rate channel will be organized into frames having at least a channel preamble to provide a timing reference between the broadcast station and the satellite. The preamble may include a unique word to identify the start of the block coding for each frame. The preamble may also include a block of timing bits containing 12–14 bits. When the broadcast station and the satellite are synchronized, the block contains 13 bits. If, due to differences in oscillators in the satellite and broadcast station, the broadcast station lags behind or moves ahead by one bit, the block of timing bits is shortened or lengthened accordingly. All channels may use the same preamble. When a source has been split among multiple prime rate channels, the preambles for all related channels should be coincident. There is no master clock synchronization between separate broadcast stations. Addition of the control word and preamble code raises the transmitted prime channel rate to 36.826 kilobits per second.

Each coded program source is divided into individual prime rate channels. In the example shown, program source 1 comprises four prime rate channels, which represents an FM quality stereo signal. Program source 2 comprises six prime rate channels, which can be used as a "near CD" quality stereo signal, or an FM quality stereo signal linked to a 32 bit data channel (e.g., for transmitting an image signal for display on EL radio receiver liquid crystal display ("LCD display")). Alternately, the six prime rate channels can be used as a 96 KBPS broadcast data channel. Each prime rate channel is modulated by a separate QPSKQ modulator 117 to an intermediate frequency. Upconverter 119 moves the separate prime rate channels to the FDMA uplink band, and the up-converted channels are transmitted through amplifier 121 and antenna 123. Broadcast uplink stations use VSAT signals for transmission of elementary (16 kbps) channels, using small antennas (2 to 3 meters diameter).

The prime rate uplink channels are transmitted to the satellite on individual Frequency Division Multiple Access (FDMA) carriers. Up to 288 uplink prime rate carriers can be transmitted to the satellite in its global uplink beam. Small as broadcaster's earth terminals equipped with 2.4 m diameter parabolic X-band antennas and 25 watt power amplifiers can easily transmit a 128 kilobit per second program channel (comprising 8 of the prime rate channels) to the satellite from a site in the country originating the program. Alternatively, program channels can be connected to shared uplink earth terminals via leased PSTN terrestrial links. The system has adequate uplink capacity for every country in its world coverage to have its own satellite radio broadcasting channel.

Radio Receivers

The radio receiver is intended to provide maximum convenience of use at a minimum cost. Low end, rudimentary radios are expected to cost the consumer approximately us $50 based on mass-produced ASIC chips, and capable of operating with solar power or batteries. The radio will receive the L band signal, demodulate and extract from the TDM stream the useful audio signal, and expand the sound into its original form.

Figure 7:
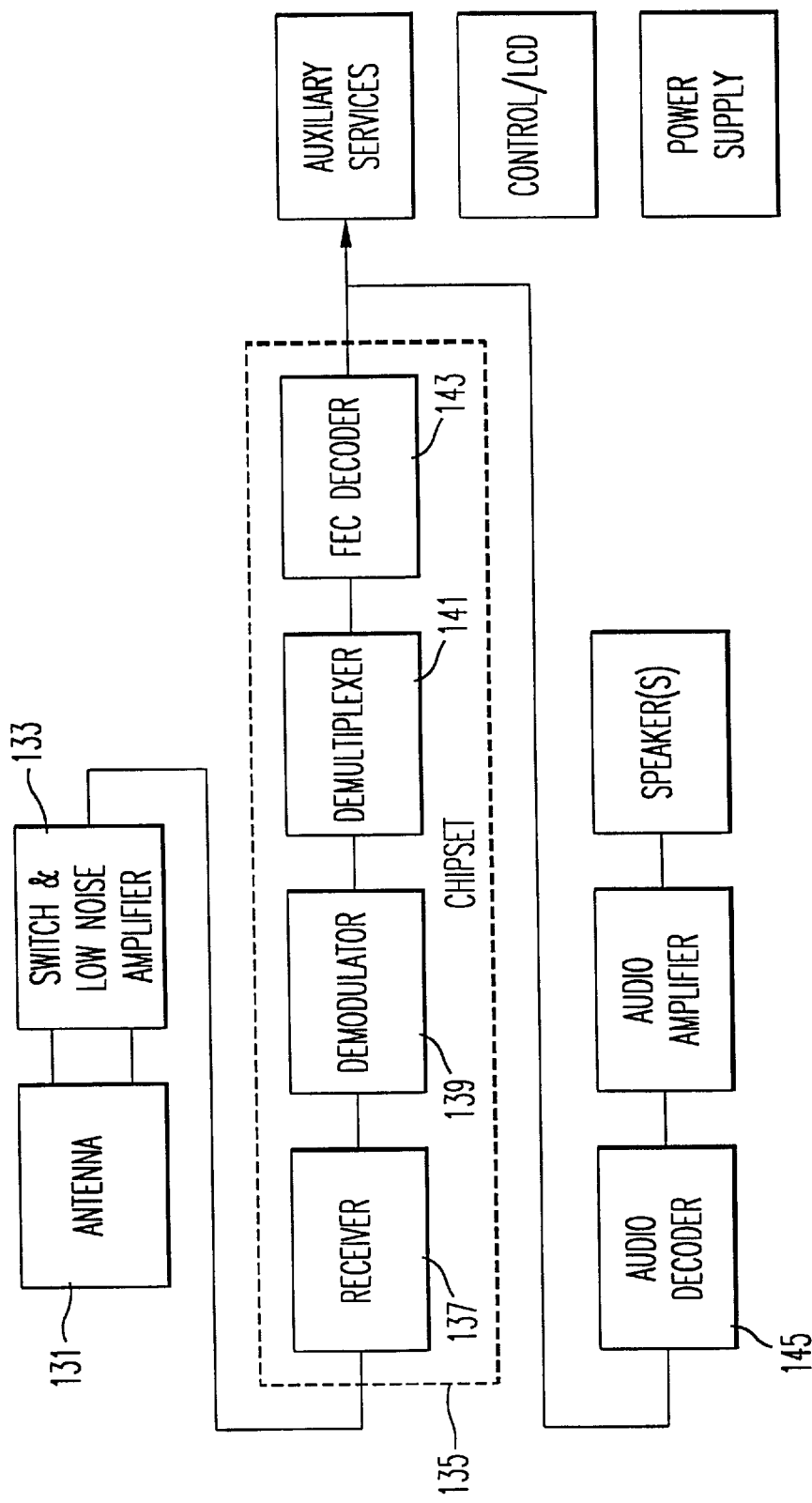
FIG. 7 illustrates program signal processing in a portable radio receiver in a satellite communication system of the present invention.

FIG. 7 illustrates program signal processing in a portable radio receiver in a satellite communication system of the present invention. Such a low cost radio receiver, equipped with a small compact patch antenna 131 having about 4 to 6 dBi gain, will require virtually no pointing and will tune automatically to selected channels. An alternative higher end radio will be equipped with an antenna that achieves 10 to 12 dBi of gain. Since such an antenna would be quite directional, it is pointed to achieve best reception. One version of this antenna may be an array of patches. The array may be embedded conformally into the surface of the radio case, attached as a lid or be completely detachable and connected to the radio by a thin coax cable a few meters long. Another version of the antenna could be a helix operating in either a broadside or end-fire mode. Pointing is done by rotating the antenna in elevation and azimuth. A detachable antenna might be mounted on a small tripod on the ground or mounted to a window frame and pointed to achieve best reception. A 10 dBi antenna has a beam width of approximately 65° and consequently will be easy to point at the satellite for achieving optimum reception. The directivity of this antenna will further enhance reception in locations where reflections might otherwise cause interference. A phased array, rod shaped antenna with wide beamwidth in one dimension but narrow in the other (i.e. a fan beam) is another alternative. Yet an alternate antenna could be a spiral antenna for outdoor reception and most indoor reception. In certain environments (mask, concrete or metal buildings), indoor reception may require connection to an external antenna. For reception by mobiles, antennas with as little as 4 dBi of gain may be mounted on the vehicle. A single antenna of this type would operate very well in an open location at high elevation angles, devoid of severe multipath reflectors. However in an area having multipath reflections, such as downtown cities, where elevations are less than 60°, measures may occasionally have to be taken to mitigate the multipath interference. One such measure is to use two or three of the 4 dBi gain antennas in a spatial diversity array mounted at various locations on the vehicle. These would be dynamically added to achieve directivity or combined so as to pick the maximum signal arrival at a given instant. Another alternative is to install a steerable fan beam directional antenna with 10 dBi of gain and make it track the satellite. This latter idea is expensive but people of means may well prefer its use to maximally benefit from the high performance quality offered by the system. As satellite mobile systems come into worldwide use in the next decade, electronically steerable array antennas are expected to drop in price and become generally affordable.

A time division multiplexing, multiple channel per carrier technique is used for downlink transmission to the radios. Each of the prime rate (16.056 kilobits per second) channels occupies its own time slot in the time division stream. These prime rate channels are combined to carry program channels ranging from 16 to 128 kilobits per second. Use of digital techniques allows for ancillary services to the radio including slow motion image, paging, mailing, fax, use of flat screens or serial interface. This data and information may be multiplexed within the audio digital signal channels.

Each radio receiver can tune to one of the 1.767688 million symbol per second TDM carriers transmitted in one of the beam coverages. As shown in FIG. 7, a low noise amplifier 133 boosts the satellite signal, and the boosted signal is received in a chip set 135. The chip set 135 includes a receiver 137, demodulator 139, time division demultiplexer 141 (which recovers the prime rate channels) and forward error correction ("FEC") decoder 143. The output of the chip set 135 is a baseband digital signal.

The instructions needed for the receiver to control recombination of the coded prime channels into the coded program channels are contained in the control word imbedded in each coded prime rate channel. The recombined coded program channels thus recovered are decoded and deinterleaved to recover the original baseband prime rate bit stream that entered the system at the broadcaster's earth terminal. The recovered bit streams are next converted back to the analog audio signal by a source decoder 145. The system can reproduce various audio qualities ranging from AM monaural to CD stereo depending on the program channel bit rate.

The user will control the whole functionality with five knobs. All information will appear on an LCD with 80 characters. For all system control functions an 8 bit micro controller with integrated LCD driver will be used. The integrated LCD driver allows the use of cheap LCD without any additional logic and reduces the number of parts needed. The microcontroller should provide 16 kByte ROM, 512 kbyte RAM.

Subscription Service

The system may incorporate subscription service under which certain program channels may be received only after a subscriber (radio receiver owner/user) has paid for service. The broadcaster of the subscription channel scrambles the broadcast. Unpaid receivers would receive a noise-like signal. A paid subscriber would then have his/her radio authorized to descrambler the subscription channel. Such descrambling can be accomplished by a decryption key.

Authorization can be accomplished in one of several ways. In a first method, the paid subscriber inserts a smartcard or memory card containing authorization to descramble the selected channel. The smartcard could also be equipped with a digital payment program that accounts for time and usage, or a debit card that is initialized with a payment amount and decrements as the receiver is used. (When the payment decrements to zero, the subscriber must pay for additional authorization.) In a second method, the paid subscriber could deliver his/her receiver to an authorized agent who downloads the required authorization through a digital data port on the receiver. In a third method, each radio receiver would have a unique, embedded identification number, and the broadcaster could include a one-bit-per-frame control channel within the broadcast preamble. When a subscriber pays for the service, the broadcast channel addresses the radio and provides an authorization signal. By whatever method, a specially designed microchip would be preferred to control authorization, either in the smart card or in the receiver itself.

After learning of the embodiments described above, people practicing in this art will be able to make variations that fall within the spirit and scope of the invention. The embodiments described above are exemplary but not intended to limit unduly the scope of the invention as defined by the following claims.

What is claimed is:

1. A receiver for receiving a time domain multiplex downlink signal comprising a plurality of time division multiplex channels, the time division multiplex downlink signal having been generated from selected ones of a plurality of prime rate channels which are combined and multiplexed by a space segment, the space segment obtaining the prime rate channels from at least one uplink used to transmit information comprising prime rate channels from a number of broadcast stations, the receiver comprising:

an antenna for receiving said downlink signal;

a demodulator for demodulating said downlink signal to recover a time division multiplex bit stream; and a demultiplexer for demultiplexing said prime rate channels from said time division multiplex bit stream, said prime rate channels each comprising a control word indicating to which of a plurality of broadcast programs each said prime rate channel belongs, and for recombining said prime rate channels corresponding to a selected broadcast program using said control word in each of said prime rate channels corresponding to said broadcast program.

2. The receiver of claim 1 wherein each of said prime rate channels is a uniform rate channel.

3. The receiver of claim 2 wherein different numbers of said uniform rate channels are combined to create respective ones of said plurality of broadcast programs having different bit rates, said receiver being operable to recover said uniform rate channels corresponding to said selected broadcast program using said control word in each of said uniform rate channels.

4. The receiver of claim 3 wherein said plurality of broadcast programs are characterized by different qualities of service corresponding to said different bit rates.

5. The receiver of claim 4 wherein said selected broadcast program is characterized by a quality of service selected from a group of qualities of service consisting of amplitude modulated monaural signal quality, frequency modulated monaural signal quality, frequency modulated stereo signal quality, and optical disc stereo signal quality.

6. The receiver of claim 1 wherein said selected broadcast program comprises a first group of prime rate channels in said plurality of prime rate channels 3 corresponding to an audio program and a second group of prime rate channels in said plurality of prime rate channels corresponding to an ancillary program, said control word in each of said prime rate channels of said first group and said second group comprising data relating said first group and said second group to said selected broadcast program and said prime rate channel corresponding to said control word to one of said first group and said second group.

7. The receiver of claim 6 wherein said ancillary program comprises at least one type of data selected from the group consisting of video, text, graphics, paging signals, database data, and file transfer data.

8. A receiver for receiving an encrypted, time domain multiplex downlink signal comprising a plurality of time division multiplex channels, the time division multiplex downlink signal having been generated from selected ones of a plurality of prime rate channels which are combined and multiplexed by a space segment, the space segment obtaining the prime rate channels from at least one uplink used to transmit information comprising prime rate channels from a number of broadcast stations, the receiver comprising:

an antenna for receiving said downlink signal;

a demodulator for demodulating said downlink signal to recover a time division multiplex bit stream;

a demultiplexer for demultiplexing a plurality of prime rate channels from said time division multiplex bit stream, said prime rate channels each comprising a control word indicating to which of a plurality of broadcast programs each said prime rate channel belongs, and for recombining said prime rate channels corresponding to a selected broadcast program using said control word in each of said prime rate channels corresponding to said broadcast program; and a subscription service device operable to disable said receiver from descrambling said downlink signal until an authorization signal is provided to said receiver, and to enable said receiver to decrypt said downlink signal after said authorization signal is provided thereto.

9. The receiver of claim 8 wherein said subscription service device comprises an input device for a card provided by a user, said card bearing data representing a decryption key for at least one of said time division multiplex channels, and said input device being configured to detect said data on said card and to decrypt said at least one of said time division multiplex channels.

10. The receiver of claim 9 wherein said card provides said user with a digital payment method selected from the group consisting of providing a credit account to bill said user for the duration said card is used to decrypt one of said time division multiplex channels, and providing a debit account and decrementing said debit account an amount corresponding to use of said card, said subscription service device being operable to disable said receiver when said debit account has a zero balance.

11. The receiver of claim 8 wherein said subscription service device comprises a memory device for storing a decryption key, said decryption key being provided to said memory device only after said user is authorized to use said receiver.

12. The receiver of claim 8 wherein said subscription service device comprises an input device for allowing a user to enter a unique identification code, said selected broadcast program comprises an authorization code, and said subscription service device is operable to compare said authorization code and said unique identification code and to disable said receiver if said authorization code and said unique identification code are different and to enable said receiver if said authorization code and said unique identification code match.

13. A method of receiving a broadcast program at a receiver via a space segment, broadcast programs being transmitted as uniform rate channels in at least one uplink to the space segment, the space segment combining and multiplexing selected ones of the uniform rate channels into a time division multiplex downlink signal, the method comprising the steps of:

receiving the time division multiplex downlink signal from the space segment, the time division multiplex downlink signal comprising a plurality of the uniform rate channels corresponding to the broadcast program, each of the uniform rate channels having a control word indicating that the uniform rate channel is related to another uniform rate channel;

demultiplexing the time division multiplex downlink signal to recover the uniform rate channels transmitted therein; and recombining the uniform rate channels corresponding to the broadcast program using the control word in each of said uniform rate channels corresponding to the broadcast program.

14. A communication system for the broadcast and reception of programs comprising:

a plurality of frequency division multiplex uplinks, each uplink including at least one information channel, the programs consisting of a variable number of uniform rate channels that are each characterized by a minimum signal rate, the information channel in each uplink comprising at least one uniform rate channel corresponding to a respective one of the programs, each uniform rate channel having a corresponding control word, the system being programmable to combine uniform rate channels corresponding to at least one program and located in different information channels into a digital signal group having a higher signal rate than the minimum signal rate and to provide the control word in each uniform rate channel in the digital signal group with at least one bit to indicate that the uniform rate channel belongs to the digital signal group;

a space segment for receiving the uplinks, restoring data from the information channels to baseband data, and combining the baseband data from selected information channels into at least one time division multiplexed signal; and at least one time division multiplex downlink including the time division multiplexed signal;

wherein each control word comprises data selected from the group consisting of data representing a number of related digital signal groups, data uniquely identifying the digital signal group to which a uniform rate channel associated with the control word belongs, data representing the number of the uniform rate channels in the corresponding digital signal group, data uniquely identifying the uniform rate channel corresponding to the control word, data representing a number of sub-ensembles constituting at least one digital signal group, data representing the number of uniform rate channels in a sub-ensemble, and data uniquely identifying a sub-ensemble.

15. A communication system for the broadcast and reception of programs comprising:

a plurality of frequency division multiplex uplinks, each uplink including at least one information channel, the programs consisting of a variable number of uniform rate channels that are each characterized by a minimum signal rate, the information channel in each uplink comprising at least one uniform rate channel corresponding to a respective one of the programs, each uniform rate channel having a corresponding control word, the system being programmable to combine uniform rate channels corresponding to at least one program and located in different information channels into a digital signal group having a higher signal rate than the minimum signal rate and to provide the control word in each uniform rate channel in the digital signal group with at least one bit to indicate that the uniform rate channel belongs to the digital signal group;

a space segment for receiving the uplinks, restoring data from the information channels to baseband data, and combining the baseband data from selected information channels into at least one time division multiplexed signal;

at least one time division multiplex downlink including the time division multiplexed signal; and a receiver configured to receive the time division multiplex downlink, to demultiplex the uniform rate channels transmitted in the time division multiplex downlink, and to recombine the selected information signals corresponding to the program using the control words.

16. A method of broadcasting a program to at least one receiver via a space segment comprising the steps of:

formatting a program into a plurality of uniform rate channels, each uniform rate channel having a corresponding control word indicating that the uniform rate channel is related to another uniform rate channel;

modulating the uniform rate channels onto different ones of a plurality of frequency division uplinks;

processing the uplinks via the space segment to recover the uniform rate channels as baseband data;

routing the baseband data into selected time slots in at least one time division multiplex downlink signal;

receiving the time division multiplex downlink signal from the space segment;

demultiplexing the time division multiplex downlink signal to recover the uniform rate channels transmitted therein; and recombining the uniform rate channels corresponding to the program using the control word in each of the uniform rate channels corresponding to the program.

* * * * *